United States Patent [19]
McClintock

[11] 3,980,908
[45] Sept. 14, 1976

[54] EXPOSURE CONTROL SYSTEM

[76] Inventor: Richard D. McClintock, Washington Road, Woodbury, Conn. 06798

[22] Filed: July 1, 1975

[21] Appl. No.: 592,112

Related U.S. Application Data

[62] Division of Ser. No. 496,765, Aug. 12, 1974.

[52] U.S. Cl. .................................. 310/14; 310/15; 310/30; 354/235
[51] Int. Cl.² ...................................... H02K 35/02
[58] Field of Search ....................... 310/14, 15, 30; 335/229, 234; 354/235

[56] References Cited
UNITED STATES PATENTS

| | | | |
|---|---|---|---|
| 3,153,735 | 10/1964 | Branagan et al. | 310/15 |
| 3,202,886 | 8/1965 | Kramer | 310/14 X |
| 3,736,448 | 5/1973 | Hebel, Jr. et al. | 310/15 |
| 3,840,297 | 10/1974 | Shoupp et al. | 310/14 X |
| 3,859,547 | 1/1975 | Massie | 310/14 |

*Primary Examiner*—Donovan F. Duggan
*Attorney, Agent, or Firm*—Hubbell, Cohen, Stiefel & Gross

[57] ABSTRACT

A system for controlling the closing of a camera shutter includes photosensitive means for detecting the available light level in the field of view of the camera to provide an output control signal a predetermined time after initiation of shutter closure dependent on the detected available light level. The power supply for the system includes a bidirectional linear magnetic generator which includes a spring drive which is mechanically loaded and unloaded by the film advance mechanism of the camera to power the exposure control circuitry. A solenoid, such as a rotary solenoid or linear solenoid magnetically latches the shutter in the open position during exposure until the solenoid coil is energized at the completion of the required exposure time to neutralize the magnetic flux in the magnetic stator of the solenoid, overcoming the magnetic latch and, due to a spring, thereafter biasing the armature to a second position which, through the mechanical linkage of the camera, closes the shutter.

15 Claims, 12 Drawing Figures

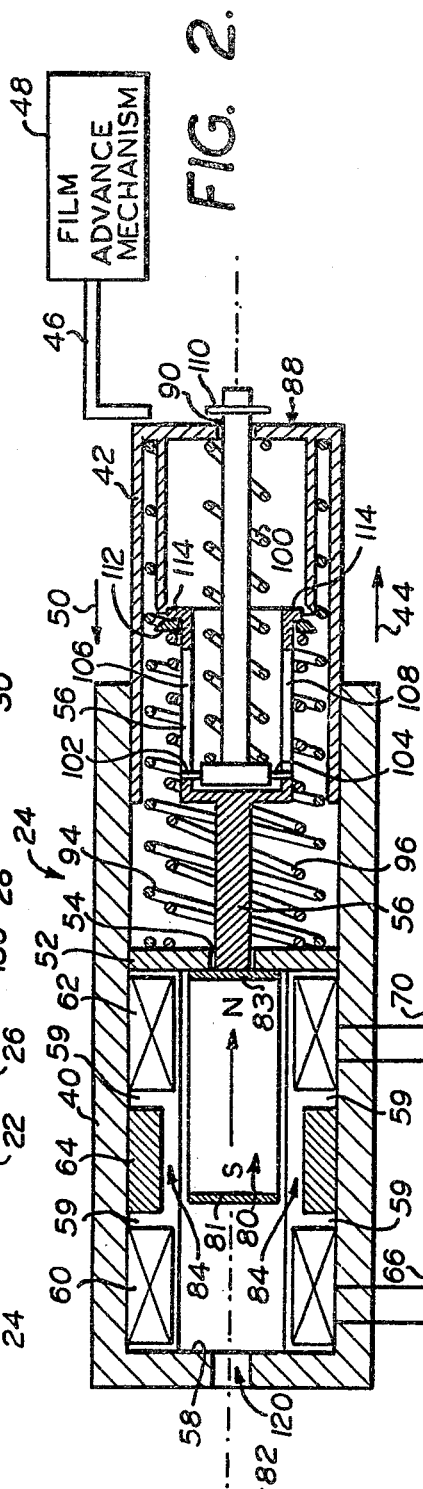
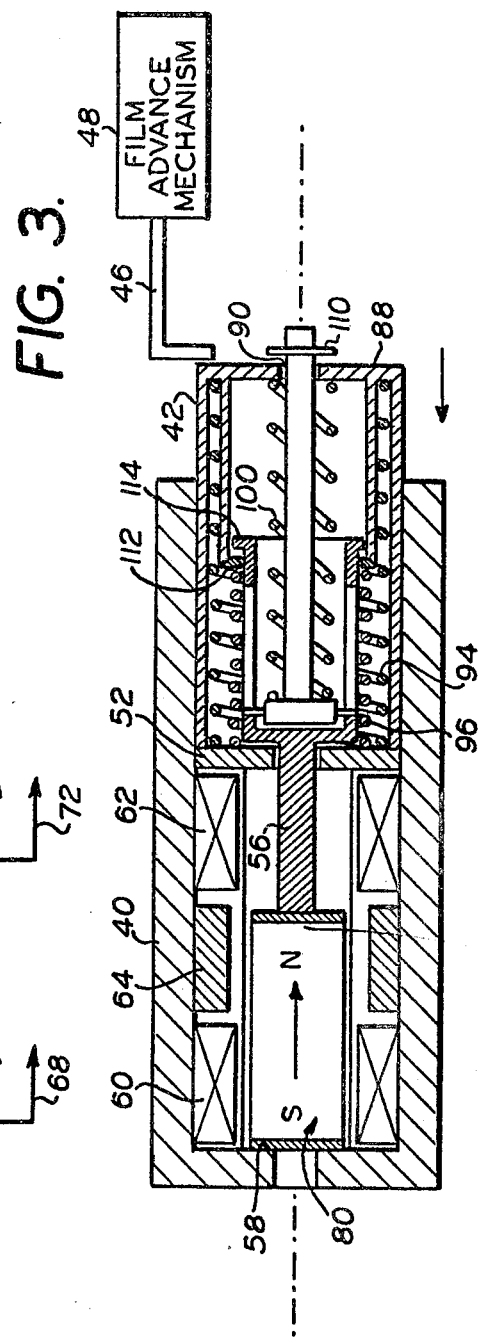

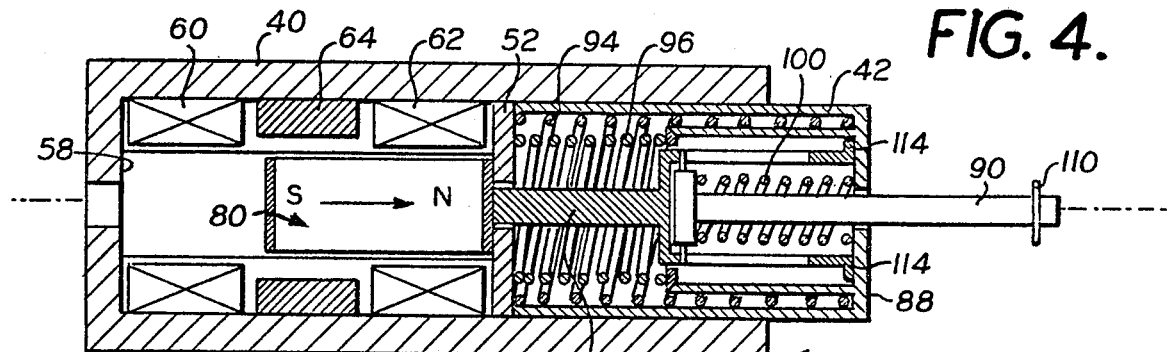
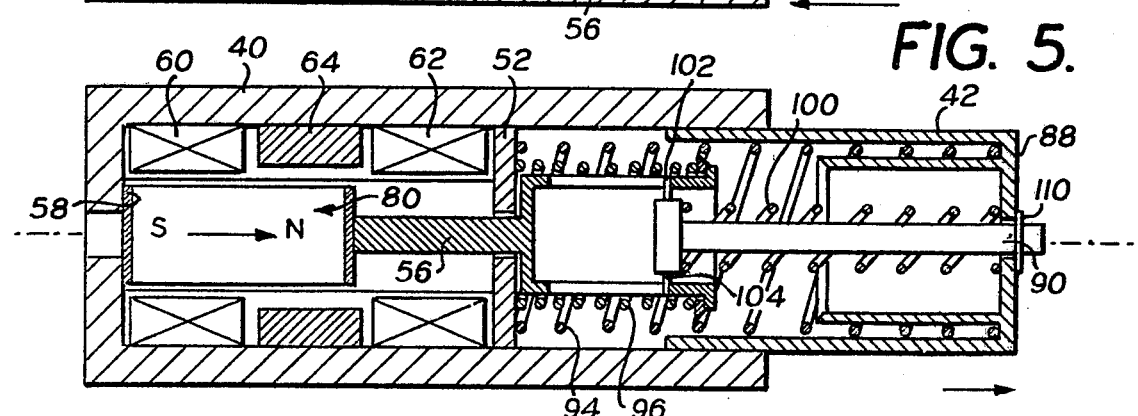
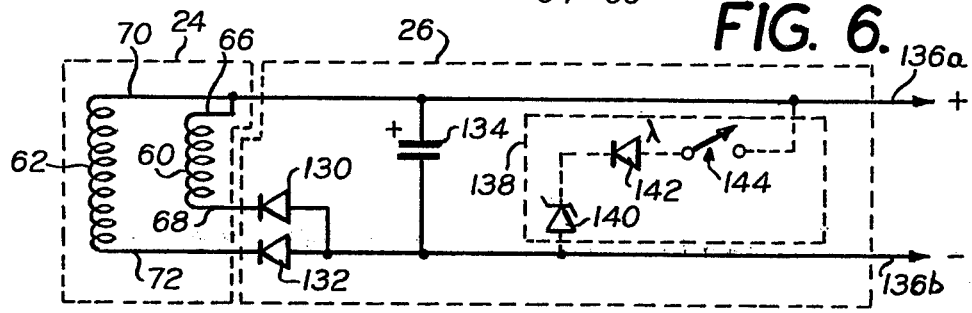
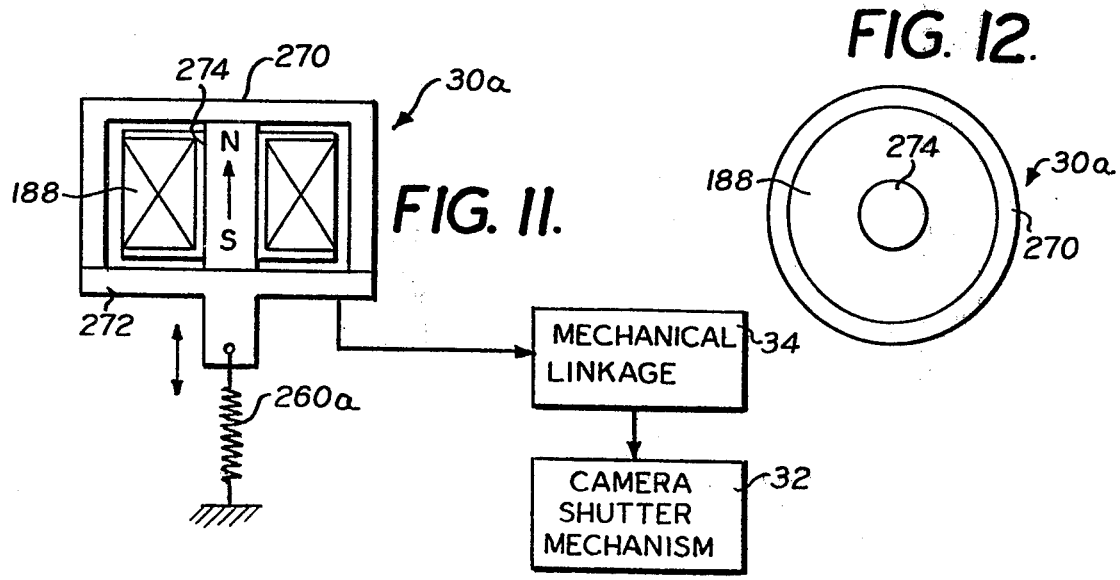

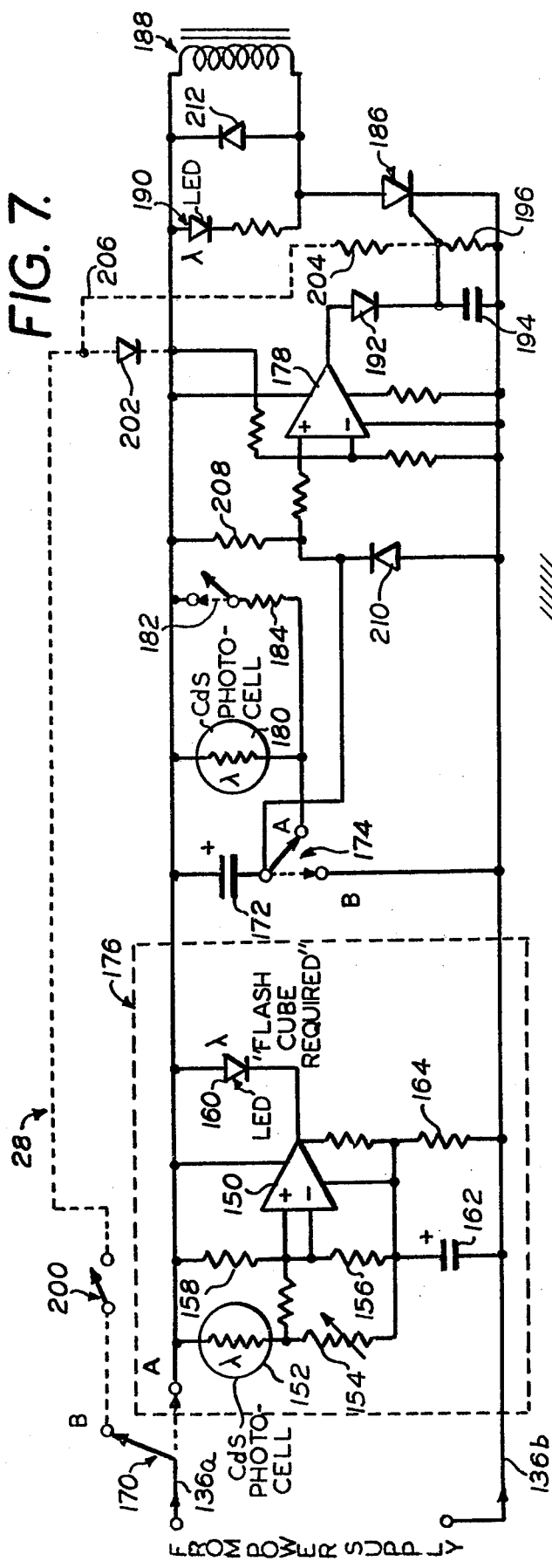
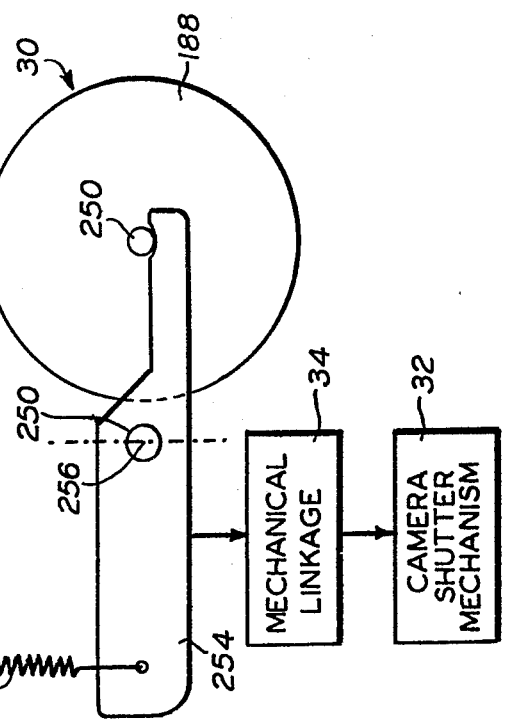
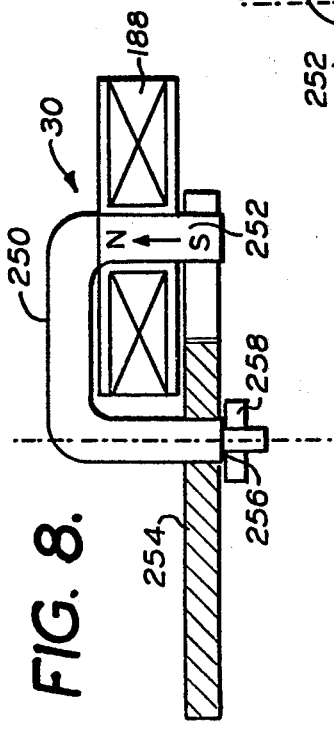
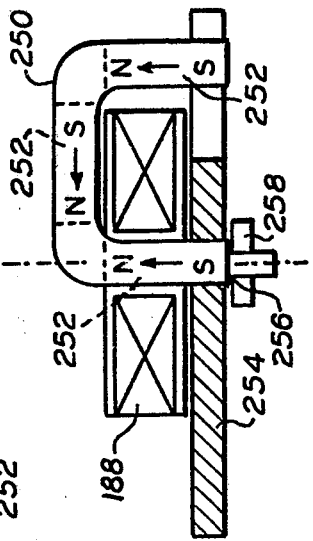
FIG. 7.
FIG. 9.
FIG. 8.
FIG. 10.

3,980,908

EXPOSURE CONTROL SYSTEM

BACKGROUND OF THE INVENTION

This is a division of application Ser. No. 496,765 filed Aug. 12, 1974, entitled "Exposure Control System."

Field of the Invention

The present invention relates to systems for controlling the closing of a camera shutter.

DESCRIPTION OF THE PRIOR ART

Systems for controlling the closing of a photographic camera shutter in response to the initiation of shutter closure are well known such as the automatic exposure control systems utilized in the Kodak Instamatic model 30 and 40 cameras. Such systems, however, are powered by a conventional battery which is constantly drained as the system is utilized and must be replaced several times during the normal life of the camera. In addition, in such prior art systems, electrical energy is utilized to hold the shutter open for the required exposure time, a solenoid being energized to accomplish this. This requirement is a further drain on the battery power supply of such cameras resulting in the eventual replacement thereof.

Magnetic generations, such as the types described in U.S. Pat. Nos. 3,132,268; 3,693,033; 3,718,828; 2,764,020; 3,398,302 and 3,130,332 are well known, although such generators have normally been of low efficiency and thus have not gained wide acceptance or utilization. Because of such low efficiency, such generators have not proved to be an acceptable alternative to conventional battery power supplies. Such inefficiencies become particularly critical where the amount of power utilized is large compared to the practical and efficient size of the generator desired.

As mentioned above, solenoids having movable armatures are well known; however, the basic principle of operation of such prior art solenoids depends on energization of the coil to latch the armature, thereby requiring a power drain to accomplish this latching function. In utilizations such as for control of the closure of a camera shutter, such power drain to latch the shutter open is undesirable and may become critical.

These disadvantages of the prior art are overcome by the present invention.

SUMMARY OF THE INVENTION

A system for controlling the closing of a photographic camera shutter in response to initiation of shutter closure includes exposure control circuitry for detecting the available light level in the photographic field of view of the camera to provide an output control signal a predetermined time after the shutter closure initiation dependent on the detected available light level. The power supply for the system includes a magnetic generator, such as a bidirectional linear magnetic generator, which includes a pair of spaced apart annular electric coils through which a permanent magnet mechanically bidirectionally movable to provide a current pulse in both directions of movement of the magnet through the coils. Mechanical movement of the magnet is preferably accomplished by the film advance mechanism of the camera which loads a spring drive for the movable magnet during the film advance cycle of the camera. The magnet magnetically latches at each of the opposite ends of the generator, with an annular electric coil being located adjacent each of these opposite ends. During the forward advance of the film advance mechanism, the spring drive of the generator is loaded a sufficient amount which, together with the associated mechanical force of the film advance mechanism, overcomes the magnetic latching force to spring drive the magnet through the coils along the longitudinal axis of the generator to generate a current pulse and cause the magnet to magnetically latch at the opposite end of the generator. As the mechanical force is withdrawn during the completion of the film advance cycle in which the film advance mechanism returns to its initial position, the loaded spring drive mechanism eventually overcomes the magnetic latching force and the magnet is again spring driven in the opposite direction through the coils to generate another current pulse and to magnetically latch once again at the opposite end from its previous latch position. This cycle is repeated each time film advance occurs. The energy generated by the magnetic generator is stored in a capacitor for providing power to the exposure control circuitry and for powering a solenoid which controls the closure of the shutter at the completion of the required exposure time. The solenoid is preferably a rotary or linear solenoid having a magnetic stator, a solenoid coil, and an armature which is magnetically latched to the magnetic stator for holding the shutter open after the shutter closure initiation until the solenoid coil is energized. The exposure control circuitry includes a gating means, such as an SCR which energizes the solenoid coil by dumping the stored generated power output at a predetermined time dependent on the detected available light level. The energized solenoid coil neutralizes the magnetic flux associated with the magnetic latch to thereafter enable the unlatched armature to move sufficient amount to cause the camera shutter to close. This movement is accomplished by a biasing means, such as a spring, which has an associated biasing force insufficient by itself to overcome the magnetic latch but sufficient to enable the requisite movement of the armature, which is preferably magnetic material such as soft iron, in the absence or neutralization of the magnetic latch.

BRIEF DESCRIPTION OF DRAWINGS

FIG. 1 is a block diagram of the preferred camera exposure control system of the present invention;

FIG. 2 is a cross sectional view, partially diagrammatic, of the preferred magnetic generator portion of the system of FIG. 1 shown in the position immediately prior to the start of the forward stroke of the generator;

FIG. 3 is a cross sectional view, partially diagrammatic, similar to FIG. 2 of the preferred generator at the completion of the forward stroke thereof;

FIG. 4 is a cross sectional view, partially diagrammatic, of the preferred generator of FIG. 2 shown in the position with the generator just prior to unlatching and completion of the forward stroke thereof;

FIG. 5 is a cross sectional view, partially diagrammatic, of the generator of FIG. 2 shown in the position with the generator ready for unlatching and initiation of the return stroke thereof;

FIG. 6 is a schematic diagram of the preferred power supply portion of the system of FIG. 1;

FIG. 7 is a schematic diagram of the preferred exposure control circuit portion of the system of FIG. 1;

FIG. 8 is a diagrammatic illustration of the preferred rotary solenoid portion of the system of FIG. 1;

FIG. 9 is a plan view in section, partially diagrammatic and partially in block, of the preferred solenoid of FIG. 8;

FIG. 10 is a diagrammatic illustration similar to FIG. 8 of an alternative embodiment of the preferred rotary solenoid of FIG. 8;

FIG. 11 is a diagrammatic illustration, partially in block of a linear solenoid alternative embodiment for the rotary solenoid of FIG. 8; and FIG. 12 is a plan view in section of the alternative embodiment of FIG. 11.

DETAILED DESCRIPTION OF THE PREFERRED EMBODIMENTS

General Description

Referring now to the drawings in detail, and initially to FIG. 1 thereof, the block diagram of the preferred camera exposure control system, generally referred to by the reference numeral 20, is shown. This system 20 may be utilized with any conventional camera in which the conventional shutter thereof may be controlled to control the film exposure. By way of example, the preferred camera exposure control system 20 of the present invention shall be described with reference to a KODAK pocket INSTAMATIC camera model 30 or 40 although, as described above, any type of camera in which the shutter exposure may be controlled can be utilized with the preferred system 20 of the present invention. For purposes of clarity, the conventional portions of the camera have been omitted except for the portions directly concerned with the system 20 of the present invention.

The camera exposure control system 20 of the present invention preferably includes a power supply portion 22 which preferably comprises a bi-directional magnetic generator 24 to be described in greater detail hereinafter with reference to FIGS. 2 through 5, and a power distribution circuit portion 26, to be described in greater detail hereinafter with reference to FIG. 6. As will be described in greater detail hereinafter, the magnetic generator 24 is the power source whose energy is distributed by the power distribution circuit 26 to energize the exposure control system 20. Exposure control system 20 also preferably includes an exposure control circuit 28, to be described in greater detail hereinafter with reference to FIG. 7 which, as will be described in greater detail hereinafter, controls the amount of time the camera shutter is held open as well as providing an indication when a time exposure or auxiliary light source, such as a flash cube, must be utilized, by detecting the available light level. A rotary solenoid 30, which shall be described in greater detail hereinafter with reference to FIGS. 8 and 9 is preferably controlled by the exposure control circuit 28 to hold the camera shutter open for the time determined by the exposure control circuit 28. This control of the conventional camera shutter mechanism through the conventional camera mechanical linkage 34 to the camera shutter mechanism 32 is what provides the proper exposure for the film, as will be described in greater detail hereinafter.

MAGNETIC GENERATOR

Before describing the operation of the preferred camera exposure control system 20 of the present invention, the magnetic generator 24 shall now be described in greater detail with reference to FIGS. 2 through 5. Referring now to FIG. 2, the magnetic generator 24 of the present invention preferably comprises a linear signal or power generator which linear power generator preferably comprises a cylindrical housing 40, preferably made of a magnetically permeable material, such as iron. The generator 24 also preferably includes a reciprocably movable cap portion 42 at one end thereof which is reciprocably movable within the interior of the housing 40 and which is spring biased in the direction shown by arrow 44 to the initial position illustrated in FIG. 2. The cap portion 42 in the system 20 of the present invention is preferably pushed into the interior of the cylindrical housing 40, such to the position illustrated in FIG. 3, by movement of a conventional push rod 46 conventionally attached to the conventional film advance mechanism 48 associated with the camera, which in the example being described, is a Kodak Instamatic model 30, in the direction illustrated by arrow 50.

A magnetically permeable iron latch disc 52 is preferably contained within the interior of housing 40 and has a diameter preferably substantially equal to the diameter of the interior of housing 40. The iron latch disc 52 preferably includes a centrally located aperture 54 through which a plunger 56 is slidably movable, as will be described in greater detail hereinafter. Aperture 54 provides a vent hole for enabling air passage therethrough, as well as increasing the magnetic latching force in the same manner as will be described with reference to aperture 120. A non-magnetic bobbin 59 is preferably located within the interior of housing 40 between the latch disc 52 and a rear wall 58 which constitutes part of housing 40. Preferably, a pair of annular electric coils 60 and 62 are would on the bobbin 59 and are spaced apart and located adjacent the longitudinal extremities of the portion of the interior of the housing formed between rear wall 58 and latch disc 52, with coil 60 being adjacent rear wall 58 and coil 62 being adjacent latch disc 52. Preferably, annular coils 60 and 62 are spaced apart by an annular permeable magnetic ring 64, such as one formed of soft iron whose outside diameter is preferably equivalent to the inside diameter of housing 40. A pair of leads 66 and 68 extend from coil 60 and another pair of leads 70 and 72 extend from coil 62 to the power distribution circuit 26, as will be described in greater detail hereinafter with reference to FIG. 6, for conducting pulses of electric current to the power distribution circuit 26. As shown and preferred in FIG. 2, a space is defined within the housing 40 within the cylindrical bobbin 59 which space preferably receives a permanent magnet 80 which is reciprocally or bidirectionally linearly movable substantially longitudinally along the axis 82 of the housing 40 in order to generate power during movement in both directions, as will be described in greater detail hereinafter. The inside diameter of ring 64 is greater than the diameter of the magnet 80 to preferably provide a gap 84 between the magnet 80 and the ring 64 which gap 84 is preferably either filled with air or a nonmagnetic substance. The annular coils 60 and 62 are preferably as close to the magnet 80 as possible. The magnet 80 preferably includes discs 81 and 83 at opposite ends thereof which discs 81, 83 are composed of a soft magnetic material and serve as flux concentrators or pole preces. If desired, only one disc may be utilized or if such flux concentration is not required, the discs may be omitted. In addition, the discs 81, 83 may be coated or painted with a resilient material to cushion the impact of the magnet 80. Furthermore, if the discs are omitted, the resilient material may be applied directly to the magnet or the resilient material may be applied to latching surfaces 52 and 58.

The cap portion of the housing 40 preferably includes a cap 88, movable draw bar 90, plunger 56, an outer spring 94 which controls the return of the cap 88, an inner spring 96 which controls return movement of the plunger 56 and magnet 80, and a spring 100 associated with draw bar 90 and plunger 56 for controlling the downward or forward stroke of the magnet 80, the return stroke, as previously mentioned, being controlled by springs 94 and 96. If desired, cap portion 42 may include an air vent therein. As shown and preferred in FIG. 2, the draw bar 90 preferably includes a pair of pins 102 and 104 for engaging slots 106 and 108 respective in the plunger 56 and, in addition, draw bar 90 also preferably includes a washer 110 which engages the cap during the return stroke thereof. In addition, a spring support washer 112 is preferably provided in conjunction with spring 96, which washer 112 preferably engages an outward flange 114 on the plunger 56 during the return stroke of the cap 88, thus providing force to power the return of magnet 80 after it has moved off latch 58.

Preferably, the pusher rod 46 associated with the camera film advance mechanism 48 contacts the cap 88 at a point in movement of the film advance mechanism 48 which enables completion of a full forward stroke of the magnet 80, which is preferably defined by the bottoming of the cap 88 on the latch disc 52, as will be described in greater detail hereinafter, and as is illustrated in FIG. 3 which shows the position of the generator 24 at the completion of the IN or forward stroke. F Spring 00 is preferably termed the downward stroke or forward stroke power spring. As the push rod 46 is advanced in the direction of arrow 50 by the film advance mechanism 48, as is conventionally accomplished in advancing the film of a KODAK INSTAMATIC model 30 camera, cap 88 is pushed downwardly or inwardly in the direction of arrow 50 pressing spring 100 while magnet 80, draw bar 90 and plunger 56 remain stationary. The cap 88 then engages spring support washer 112 thus compressing inner spring 96 as this downward movement in direction of arrow 50 continues, this movement thereby freeing plunger 56 from the upward force, that is in the direction of arrow 44, of spring 96. Outer spring 94 has this downward movement in the direction of arrow 50 continues due to the longitudinal movement of pusher rod 46, is compressed by this movement of cap 88. When cap 88 finally bottoms on the plunger, such as illustrated in FIG. 4, the plunger 56 is still stationary and the magnet 80 is still latched to the iron latch disc 52, such bottoming occurring when the flange 114 of plunger 56 contacts the interior of cap 88 as illustrated in FIG. 4. Continued downward further movement of cap 88 in the direction of arrow 50 forces magnet 80 off latch disc 52. Thereafter, magnet 80 and plunger 56 attached thereto are driven by downward stroke of power spring 100 through coils 62 and 60, respectively, to latch on the bottom of the housing 58.

As shown and preferred in FIG. 2, the bottom of the housing 58 preferably includes an aperture or vent hole 120 therein which is preferably sized to provide the maximum desirable magnetic latching force by reducing the area of the magnetically permeable material in the vicinity of the flux field by a desired amount, this reduction area providing a higher $B^2 \phi$ factor, where B is the magnetic field strength and $\phi$ is the magnetic flux, due to a resultant increase in B with reduction area. However, the reduction in area is chosen so as to also preferably not reduce $\phi$ by too great an amount. Thus, the reduction in area provides a higher magnetic latching force, with the vent hole 120 also serving to vent the housing so that a partial vacuum will not be generated behind the moving magnet. This concept with respect to the vent hole 120 is clearly described in my copending patent application entitled "Spring Return Linear Signal Generator", and bearing U.S. Ser. No. 378,916, filed July 13, 1973.

The magnet 80 is preferably guided by the inner wall of the bobin 59, but preferably the magnet 80 is in clearance relation with this inner wall. The movement of magnet 80 in the direction of arrow 50 relative to the other components of the magnetic circuit alter the flux field in the magnetic circuit and induces the voltage in coils 62 and 60 which result in an electric current flow, which will be discussed in greater detail hereinafter with reference to FIG. 6, in the power distribution circuit 26 which the coil 62 and 60 are connected to lead 70 and 72 and 56 and 58, respectively. Thus, both coils 62 and 60 generate current while magnet 80 is driven through them by spring 100, the magnet 80 thereafter being latched on the bottom 58.

As the film advance cycle is completed and the push rod 46 returns to the retracted position of FIG. 2, the cap 88 is released. As cap 88 is released, the cap 88 is driven outwardly in the direction of arrow 44 by outer spring 94. As this occurs, spring support washer 112 engages flange 114 of plunger 56 and washer 110 of draw bar 90 engages the cap 88. In this manner, the downward force in the direction of arrow 50 of the downward stroke power spring 100 is removed from the plunger 56 and the outward force in the direction of arrow 44 of spring 96 is substituted However, this outward force of spring 96 is preferably insufficient to pull magnet 80 off its bottom latch position at bottom 58, which is the position illustrated in FIG. 5. As the cap 88 continues outwardly due to the outward force of spring 94, pins 102 and 104 on the draw bar 90 preferably engage the ends of the slots 106 and 108 in the plunger 56. The outward force of inner return spring 96 then is added to the outward force of outer spring 94. This combined force is sufficient to overcome the bottom latching force of magnet 80 and further movement of cap 88 in the direction of arrow 44 which now results from the combined outward force of springs 94 and 96 pulls magnet 80 off the bottom latch 58 driving magnet 80 through coils 60 and 62, respectively, in the return stroke direction of arrow 44, the drive itself being accomplished by spring 96, to generate a current in the opposite direction to that generated during the forward stroke in both coils 60 and 62. After this return stroke has been completed, the magnetic generator 24 again resembles the configuration illustrated in FIG. 2.

POWER DISTRIBUTION CIRCUIT

The above described preferred magnetic generator 24 is an improvement on my previous spring return linear signal generator described in my aforementioned copending U.S. patent application, U.S. Ser. No. 378,916, filed July 13, 1973, the contents of which are hereby specifically incorporated herein by reference. As previously described with reference to FIG. 1, the preferred improved magnetic generator 24 together with the power distribution circuit 26 fully comprises the power supply 22 of the camera exposure control system 20 of the present invention, no other power source being required. As shown and preferred in FIG. 6, the actual output of coils 60 and 62 of magnetic generator 25 is preferably fed through a half-wave rectifier formed by a pair of diodes 130 and 132 connected in parallel with diode 130 being connected to the output of coil 60 and diode 132 being connected to the output of diode 62 via leads 68 and 72, respectively, and with leads 70 and 66 at the opposite ends of the coils 62 and 60, respectively, being connected in parallel. If desired, full-wave rectification could be utilized for the outputs of coils 60 and 62, however, in such an instance, proper impedance match would require additional capacitance thereby increasing the circuit complexity although increasing the power output.

In the preferred arrangement illustrated in FIG. 6, the proper coil 60 or 62 output is preferably chosen dependent on the maximum velocity attained at the end of the stroke of the magnet 80 in order to obtain the maximum voltage output. Thus, during the forward stroke when the magnet 80 is moving in the direction of arrow 50 illustrated in FIG. 2, the maximum velocity is attained as the magnet 80 moves through coil 60, whereas during the return stroke indicated by movement of the magnet 80 in the direction of arrow 44 in FIG. 2, the maximum velocity of the movement of magnet 80 is attained as the magnet 80 moves through the coil 62. Thus, preferably, on the IN stroke or forward stroke, it is the output of coil 60 which is selected and on the OUT stroke or return stroke, it is the output of coil 62 which is selected. This selection is accomplished by diodes 130 and 132 since, on the forward stroke, coil 60 and 62 generate a current in opposite direction, and, similarly, on the return stroke coils 60 and 62 generate an output current in opposite directions, the appropriate diode 130 and 132 thereby blocking the output of the other or less significant coil during the forward stroke or return stroke, respectively. Thus, during the forward or In stroke, diode 132 blocks the output of coil 62 and on the OUT or return stroke, diode 130 blocks the output of coil 60.

As shown and preferred in FIG. 6, the power distribution circuit 26 also preferably includes a capacitor 134 connected across the output leads of the paallel connected coils 60 and 62. Capacitor 134 preferably stores the output current of the coils 60 and 62 for subsequent future use, to be described in greater detail hereinafter, the stored output current conventionally being provided via output leads 136a and 136b to the exposure control circuit 28. If desired, as illustrated in dotted lines in FIG. 6, a full charge indicator 138 could be utilized to indicate when capacitor 134 has been charged to a sufficient voltage to operate the exposure control circuit 28. This optional full charge indicator 138 preferably includes a conventional zener diode 140, a conventional light emitting diode 142 and a switch 144 which preferably could be actuated either manually or by slightly depressing the conventional shutter trip button of the camera or, if desired, by movement of the film advance button or, if desired, by movement of the magnetic generator 24. If no such full charge indication is desired, full charge indicator 138, which is shown as connected in parallel between leads 136a and 136b, is preferably omitted.

EXPOSURE CONTROL CIRCUIT

Referring now to FIG. 7, the preferred exposure control circuit 28 of the present invention is shown. Preferably, this exposure control circuit 28 is substantially identical with that conventionally utilized in the KODAK INSTAMATIC model 30 camera apart from the preferred power supply 22 previously described above and the other differences to be described in greater detail hereinafter. The exposure control circuit 28 preferably includes a conventional operational amplifier 150 which detects the light level from a bridge circuit which preferably comprises a conventional cadmium sulfide photocell 152, a variable resistor 154, and resistors 156 and 158, as shown and preferred in FIG. 7. Preferably, if the detected light level is at such a low value that an exposure of greater than 1/30 of a second would be required, operational amplifier 150 provides an output signal to a conventional light emitting diode 160 connected to the output thereof, which light emitting diode 160 is preferably lit momentarily as a capacitor 162 connected between the bridge circuit 152-154-156-158, operational amp power and ground is charged. In the conventional KODAK circuitry, light emitting diode 160 is used to indicate that a flash cube is required or that the camera must be held still for a time exposure. A typical conventional light emitting diode which could be utilized is a Monsanto MV 200, which is conventionally driven by the conventional programmable micro power operational amplifier 150, such as a Fairchild $\mu$A776. As shown and preferred in FIG. 7, a resistor 164 is connected across capacitor 162 to provide a discharge path to ground, as will be described in greater detail hereinafter. Thus, except for the R-C combination of capacitor 162 and resistor 164, the previously described circuitry is essentially conventional KODAK circuitry. The purpose of the R-C combination 164-162 is to turn off light emitting diode 160 after it has turned on, the reset time constant preferably being between 5 and 10 seconds and the light emitting diode 160 preferably being on 10 to 50 milliseconds, which is the charge time, preferably, of capacitor 162. This arrangement therefore provides a blink of light emitting diode 160 rather than having this light emitting diode 160 remain on, capacitor 162 acting as a low impedance while charging.

The operation of this aforementioned portion of the exposure control circuit 28 is as follows. If the light level detected by the bridge circuit including photocell 152 is insufficient, operational amplifier 150 goes low turning on light emitting diode 160. The current passing through the operational amplifier 150 flows into capacitor 162 until this capacitor 162 is charged thereafter cutting off current flow in the circuit. Resistor 154 is preferably a very high impedance, such as 10 megohms, and, accordingly, the only substantial current flow path when operational amplifier 150 is on is through capacitor 162 until this capacitor 162 has charged. As mentioned above, when capacitor 162 has charged the current flow in the circuit is cut off and light emitting diode 160 turns off. Capacitor 162 then discharges through resistor 164 to ground to reset the circuit. If desired a switch may be used in place of resistor 164. In the aforementioned bridge circuit 152-154-156-158, if insufficient light is detected by photocell 152, then the positive input of operational amplifier 150 is low compared to the negative input and the output of operational amplifier 150 goes low turning on the light emitting diode 160 as previously mentioned, resistor 154 being variable for purposes of calibration.

After film advance has occurred in the camera, capacitor 134 is charged, as previously described with reference to FIG. 6. There are no other connections preferably other than the low leakage diodes 130 and 132 which could drain current resulting in a long storage time for capacitor 134, this long time is possible due to the slow leakage from capacitor 134 and diodes 130 and 132. When the conventional shutter button of the camera is partially depressed a main switch 170 to position A illustrated by the dotted lines in FIG. 7 completing the circuit between the power supply 24-26 and the exposure control circuit 28 via leads 136a and 136b. This supplies power to charge a capacitor 172 connected across leads 136a and 136b through a switch 174 which is the shutter switch, capacitor 172 being charged with the shutter switch 174 in the closed position indicated by position B on the dotted lines in FIG. 7 power is also supplied to the previously mentioned light level detection circuit 176 as well as to another conventional operational amplifier 178, such as one of the type previously utilized for operational amplifier 150. If desired, an additional switch could be inserted in the circuit to keep operational amplifier 178 off until the shutter switch 174 went to position A shown by the solid line in FIG. 7. As the conventional shutter button is further depressed, the conventional camera shutter comprising shutter mechanism 32 is released and opens causing switch 174 to go to position A. Capacitor 172 then discharges through a conventional light sensor cadmium sulfide photocell 180 and, if a flash cube has been utilized, in which instance a switch 182 is closed to complete a circuit to lead 136a, through a resistor 184, which resistor is a conventional exposure correction resistor, and the closed flash switch 182. Thus, photocell 180 is a light sensor which preferably controls the discharge time of capacitor 172 by virtue of its impedance increasing as the available light level decreases.

Thus, the circuit of FIG. 7 uses very litter power, the power being measured in micro watts until after the level sensor operational amplifier 178 detects that the integrator formed by capacitor 172 and photocell 180 has gone to preferably half of the supply voltage provided from capacitor 134 via leads 136a and 136b, or any other predetermined fraction; in other words, after capacitor 172 has discharged a predetermined amount. It should be noted that the supply voltage from capacitor 134 is stored on capacitor 172 until this capacitor 172 discharges. When this occurs, a conventional SCR 186, such as a Unitrode 3027, is fired and the charge remaining on the power supply capacitor 134 (FIG. 6) is then dumped through the solenoid coil 188 of rotary solenoid 30 thus releasing the armature thereof which, as will be described in greater detail hereinafter, holds the shutter mechanism 32 open. In addition, a conventional light emitting diode 190 is let indicating closure of the shutter and completion of the exposure.

The operation of this portion of the exposure control circuit 28 is therefore as follows. The output of operational amplifier 178 preferably goes high when the preset level described above has been reached. As shown and preferred in FIG. 7, a diode 192 is connected to the output of operational amplifier 178, diode 192 being a level shifter to allow the output of operational amplifier 178 to be slightly higher than ground in the low state of operational amplifier 178 while not firing the SCR 186 in this state. When the output of operational amplifier 178 goes high, diode 192 conducts and SCR 186 fires. As also shown and preferred in FIG. 7, a capacitor 194 is connected between te gate of SCR 186 and ground, this capacitor being a conventional RFI damper and, in addition, a conventional gate resistor 196 is connected to the gate of SCR 186. SCR 186 preferably blocks the output of capacitor 134 from reaching solenoid coil 188 until the SCR 186 fires. This keeps the camera shutter comprising shutter mechanism 32 open until the integrator formed by photocell 180 and capacitor 172 has measured sufficient light for proper exposure as described above. Accordingly, there is no substantial power drain until the camera shutter is to be closed.

As shown and preferred in FIG. 7, main switch 170 will move to position B, which is shown by solid lines in FIG. 7, when the conventional shutter button is released. If the shutter has not closed yet, in other words less than the full exposure time has passed, the power to the coil 188 and the control circuit therefor described above is cut off and the shutter remains open which is normally undesirable. This condition may be eliminated, if desired, in several ways such as by instructing the user not to release the shutter button until light emitting diode 190 has been lit, or by providing a mechanical linkage between the shutter release button and the shutter to force its closure or, as shown and preferred by way of example in FIG. 7, by an electronic circuit comprising a switch 200, a diode 202 and a resistor 204. This preferred optional arrangement shown in dotted lines in FIG. 7 operates as follows. Switch 200 is closed when the shutter is open; however, no current flows through this circuit because, as previously described, main switch 170 is in position A. If there is charge stored on capacitor 134 (FIG. 6) and the shutter is released, then current will flow through resistor 204 turning on SCR 186. Current then flows through diode 202, coil 188, light emitting diode 190 and SCR 186. The shutter is then closed, thereby opening switch 200. Diode 202 preferably prevents current from main switch 170 in position A from firing the SCR 186 by blocking path 206.

As is also shown and preferred in FIG. 7, exposure control circuit 28 preferably includes a compensating resistor 208 which preferably compensates for the voltage drop during exposure in conventional fashion and for the operational amplifier 178 bias current. The circuit also preferably includes a diode 210 for protecting the input of operational amplifier 178 against polarity reversal as well as another diode 212 connected across solenoid coil 188 to provide transient suppression. As was previously mentioned, operational amplifiers 150 and 178 are preferably conventional programmable micropower operational amplifiers so as to minimize the current drain in the exposure control circuit 28.

ROTARY SOLENOID

Referring now to FIGS. 8 and 9, the preferring rotary solenoid 30 of the present invention for controlling the closure fof the shutter comprising shutter mechanism 32 shall be described. Referring now to FIGS. 8 and 9, the preferred rotary solenoid 30 preferably includes a Stator comprising a U-shaped ferrous bar 250, such as iron, including a conventional permanent magnet 252. A ferrous armature 254 is preferably pivotally connected to ferrous bar 250 at point 256 such as by means of a conventional nut 258. As shown and preferred, solenoid coil 188 is wrapped about one leg of the ferrous bar 250, the coil 188 preferably being shown wrapped about the leg of the ferrous bar 250 containing the magnet 252. In the open position of the shutter, armature 254 preferably abuts against ferrous bar 250, as shown in FIG. 9, and completes the flux path from the magnet 252 to magnetically latch armature 254 against the bar 250. As shown and preferred in FIG. 9, a spring 260 preferably biases armature 254 toward the open position away from bar 250, however, the spring force associated with spring 260 is preferably insufficient to overcome the magnetic latch force. When solenoid coil 188 is energized, in the manner previously described with reference to FIG. 7, energized coil 188 neutralizes the flux in bar 250 by producing a substantially equal and opposite flux and, thereafter, spring 260 biases armature 254 away from bar 250, the armature 254 now pivoting away from the magnetic latch against bar 250 thereby causing the camera shutter to close due to the motion of armature 254 in conjunction with mechanical linkage 34 and the camera shutter mechanism 32 which are conventional. When the opening of the shutter is again initiated, armature 254 again latches magnetically against bar 250. If desired, such latching can occur during film advance. If desired, armature 254 can be provided with a counter-balance to reduce the effects of shock and vibration. Thus, the overall operation of the preferred camera exposure control system 20 of the present invention has now been described.

ALTERNATIVE SOLENOID

If desired, as shown and preferred in FIG. 10, the permanent magnet 252 associated with the U-shaped ferrous bar 250 may comprise any part of the U-shaped ferrous bar or stator 250, three such positions being shown by way of example or, if desired, the entire U-shaped bar 250, in other words all of the Stator, may comprise a magnet, the magnet may comprise part or all of the armature 254 and/or the coil 188 may be wound on any leg of the stator or ferrous bar 250 without departing from the spirit and scope of the present invention.

In addition, if desired, as shown and preferred in FIGS. 11 and 12, the preferred rotary solenoid 30 may be replaced by a linear solenoid 30a of the type illustrated in FIGS. 11 and 12. In this arrangement, an annular ferrous cup 270 is preferably provided in juxtaposition with a ferrous disc 272. Preferably a permanent bar magnet 274, which is equivalent to magnet 252, is located along the central axis of the cup 270 completing a magnetic circuit between the cup 270 and the disc 272. The annular solenoid coil 188 is contained within the ferrous cup 270 and surrounds the bar magnet 274. The ferrous disc, which comprises the armature of the linear solenoids 30a is preferably biased by spring 260a in the same manner as previously described with reference to spring 260 of the rotary solenoid illustrated in FIGS. 8 and 9. The operation of linear solenoid 30a, which effectively forms two U-shaped stators in cross-section, is preferably the same as that previously described with reference to the preferred rotary solenoid 30 with the exception that the disc 272 preferably pulls away from the stator 270 as opposed to having the armature 254 pivot away from the stator or ferrous bar 260, this movement of the disc 272 through mechanical linkage 34 closing the shutter comprising camera shutter mechanism 32. It should be noted that the bar magnet 274 may preferably be at any location in the cup assembly 270 or in the disc 272 without departing from the spirit and scope of the invention.

It is to be understood that the above described embodiments of the invention are merely illustrative of the principles thereof and that numerous modifications and embodiments of the invention may be derived within the spirit and scope thereof such as by utilizing the exposure control system of the present invention to control the closing of a conventional electrostatic shutter in which instance the solenoid is omitted and the SCR output is directly connected to the electrostatic shutter, or such as by utilizing the force of the power spring along to overcome the magnetic latching force.

What is claimed is:

1. A solenoid comprising a solenoid coil, a movable armature means whose movement is controlled by said solenoid coil, and a magnetic stator means, said solenoid armature means being magnetically latched to said magnetic stator means in a first position until said solenoid coil is energized, said energized solenoid coil overcoming said magnetic latch to enable said unlatched armature means to move to a second position, said armature means comprising a movable magnetic member and a biasing means connected to said movable member for biasing said movable magnetic member away from said magnetic latch position with said magnetic stator means with a biasing force insufficient by itself to overcome said magnetic latch but sufficient to enable said armature means movement to said second position in the absence of said magnetic latch, said magnetic latch being a result of the magnetic flux between said magnetic stator means and said armature means movable magnetic member, said solenoid coil being juxtaposed with said magnetic stator for producing a magnetic flux substantially equal to and opposite to said magnetic latch magnetic flux when said coil is energized for neutralizing said magnetic latch flux, said movable magnet member effectuating said armature movement to said second position due to said biasing means when said magnetic latch magnetic flux is neutralized.

2. A solenoid in accordance with claim 1 wherein said magnetic stator means comprises a U-shaped ferrous bar, said movable magnetic member being pivotally mounted thereto for pivotal movement toward and away from said magnetic latch position of said movable magnetic member against said ferrous bar 3. A solenoid in accordance with claim 2 wherein said solenoid coil is an annular coil surrounding at least one leg of said ferrous bar.

4. A solenoid in accordance with claim 2 wherein said ferrous bar further comprises a permanent magnetic means.

5. A solenoid in accordance with claim 1 wherein said magnetic stator means comprises an annular ferrous cup and said movable magnetic member comprises a ferrous disc mounted for linear movement away from said ferrous cup by said biasing means.

6. A solenoid in accordance with calim 5 wherein said magnetic stator means further comprises a permanent magnetic means.

7. A solenoid in accordance with claim 6 wherein said permanent magnetic means comprises a bar magnet located within said annular cup interior along the longitudinal central axis of said annular cup in magnetic association therewith, said solenoid coil being an annular coil surrounding said bar magnet within said annular cup.

8. A bidirectional linear signal magnetic generator comprising an electric coil means and a magnetic means mechanically bidirectionally movable with respect to said coil means for providing an output power signal in response to said relative bidirectional mechanical movement of said magnetic means with respect to said coil means, said generator further comprising a housing having a longitudinal axis, said electric coil means comprising a pair of annular coils of electrically conductive material mounted about said longitudinal axis and longitudinally spaced apart from each other, said coils extending in a direction along a portion thereof, said magnetic means comprising a permanent magnet means resiliently mounted within said housing for repetitive bidirectional axial movement along said longitudinal axis through both of said coils, said magnet creating a magnetic flux field, both of said coils being within said magnetic flux field, substantially all of the output flux of said magnet completely threading both of said coils, said resiliently mounted magnet comprising a permanenet magnet and first and second compressible spring means, said generator further comprising means for mechanically moving said magnet in a first direction with an associated force along said axis to compress said first and second spring means to a loaded condition, said first spring means having an associated biasing force in said loaded condition, said housing further comprising first means for latching said magnet at one end of one of said annular coils with a first latching force, said magnet remaining latched with said first latching force until said mechanical movement associated force exceeds said first latching force, said first spring means biasing force thereafter propelling said magnet means substantially through both of said annular coils toward the other end thereof, said first direction propelled magnet producing a first change in said magnetic flux field, said coils being responsive to said first change in said flux field to generate a first electric current pulse due to said direction propelled magnet movement, said second spring means having an associated return biasing force when said magnet is at said other end, said housing further comprising second means for latching said propelled magnet at said other end with a second latching force, said magnet remaining latched with said second latching force until said mechanical movement associated force is decreased a sufficient amount to enable said second spring means return biasing force to exceed said second latching force, said second spring means return biasing force thereafter propelling said magnet means through both of said coils toward said one end in a direction opposite to said first direction to latch against said first latching means, said opposite direction propelled magnet producing a second change in said magnetic flux field, said coils being responsive to said second change in said flux field to generate a second electric current pulse due to said opposite direction propelled magnet movement.

9. A generator in accordance with claim 8 further comprising means for combining each of said first and second current pulses to produce said generated output signal.

10. A generator in accordance with claim 8 wherein said generator housing comprises a magnetically permeable portion at each end thereof, one of said coils being mounted adjacent each of said ends, said other end comprising said first latching means when said magnet is substantially in engagement therewith, said other end portion comprising a portion therein which is of a predetermined dimension sufficient to reduce the engageable area of said magnetically permeable portion and increase said first latching force, said reduced area having a higher $B^2\phi$ than said other end portion without said reduction in area.

11. A generator in accordance with claim 8 wherein said magnet moving means comprises a plunger means mounted for movement along said axis, said plunger having an outer end portion being engageable with said permanent magnet in a first position in which the plunger is depressed into said housing a sufficient amount to move said magnet into engagement with said one end, said second spring means comprises a power spring compressible between said housing and said magnet and adapted to drive said magnet through said coils in said opposite direction from said other end toward said one end and a plunger spring compressible between said housing and said plunger and adapted to drive said plunger in said opposite direction out of said housing and lost-motion coupling means associated with said magnet and said plunger and engageable therebetween in a second position of said plunger in which said plunger inner end is spaced a substantial distance from said magnet, such engagement resulting in the addition of the return biasing forces generated by the plunger spring and the power spring, the return biasing force generated by the power spring being less than the first magnetic latching force holding the magnet latched at said other end such that said magnet remains latched at said other end until such addition of the spring forces, the combined return biasing forces of the power and plunger springs being substantially greater than the first magnetic latching force holding said magnet latched at said one end such that said magnet is unlatched from engagement and is driven by said power spring along said axis in said opposite direction, whereby a change in the magnetic flux field is produced and an electric current flow is induced in said coils.

12. A generator in accordance with claim 10 wherein a magnetically permeable disc member comprises said magnetically permeable portion at said one end, said disc member comprising said second latching means when said magnet is substantially in engagement therewith.

13. A generator in accordance with claim 9 wherein said combining means comprises half-wave rectification means for selecting the generated coil output having the greatest value in each of said generation directions of movement for providing said generated output signal therefrom, said coils generating outputs of opposite polarity driving each of said directions of movement of said magnet.

14. A system in accordance with claim 8 wherein said permanent magnet means comprises magnetic flux concentration means located adjacent at least one of the magnetically latchable ends of said magnet.

15. A system in accordance with claim 14 wherein said magnet flux concentration means is located adjacent each of the magnetically latchable ends of said magnet.

* * * * *